May 26, 1964  R. J. DAVISON  3,134,275
CONTROL FOR POWER TOOL AND THE LIKE
Filed Oct. 23, 1961  2 Sheets-Sheet 1

INVENTOR.
ROBERT J. DAVISON
BY
Albert L. Jeffers
ATTORNEY

United States Patent Office 3,134,275
Patented May 26, 1964

3,134,275
CONTROL FOR POWER TOOL AND THE LIKE
Robert J. Davison, 26 Woodside Drive, Arcanum, Ohio
Filed Oct. 23, 1961, Ser. No. 146,855
6 Claims. (Cl. 74—789)

This invention relates to a control for power tools and the like, and more specifically to a control for regulating the speed of operation of the power tool, as for example, by controlling the rotary speed of a drill which is held in a chuck of the tool or controlling the rotational speed of a screw driver or wrench which can be mounted onto the shank of the tool. Power-operated fixtures are now available having various tool ends, and such fixtures can be snap fitted or adapted for mounting in various ways onto the work chuck of the power operating device. It is an important advantage in operating the power device if the operator has a readily accessible means for controlling the rotational speed of the work chuck and its attached fixture. This greater degree of control provides the operator with improved precision of operation and makes it possible to use a heavy, highly-powered tool to perform delicate, exacting assembly operations.

It is an object of the present invention to provide a dual transmission from the motor to the work chuck in which one transmission provides for full power non-controlled transmission of power and the other transmission includes a control mechanism which is under the regulation of the tool user and can be readily operated to provide an infinite speed graduation from zero speed to an upper limit of usable speed generated by the motor.

It is a further object of the invention to provide a control mechanism for rotary power-driven tools and the like in which a speed control mechanism is provided in proximity with a tool handle or the like so that by exerting different degrees of gripping effort, the operator can control the speed of rotation of the tool whether it be a wrench, drill, screw driver or the like mounted in a suitable chuck of the power tool.

A further object of the invention is to provide a control mechanism for regulating the output speed of the power tool in accordance with an infinite graduation of speed and which can operate with only a minor loss of available power so that the tool is operated at a controlled speed and at substantially the rated output of the motor.

Another object of the invention is to provide a novel combination of gears which can be driven in one direction or the other to provide a graduation in tool output speed from zero to an upper limit of speed and is subject to a manual control for determining the output speed of the tool so that any fixture operated by the tool can be closely controlled in either direction of its rotation.

Another object of the invention is to provide a power tool which can include a speed control or not depending upon the operating characteristics desired. For example, the speed control can be used or locked out depending upon the operating requirements of the tool.

Other objects and features of the invention will become apparent from a consideration of the following description which proceeds with reference to the accompanying drawings wherein.

Figure 1:
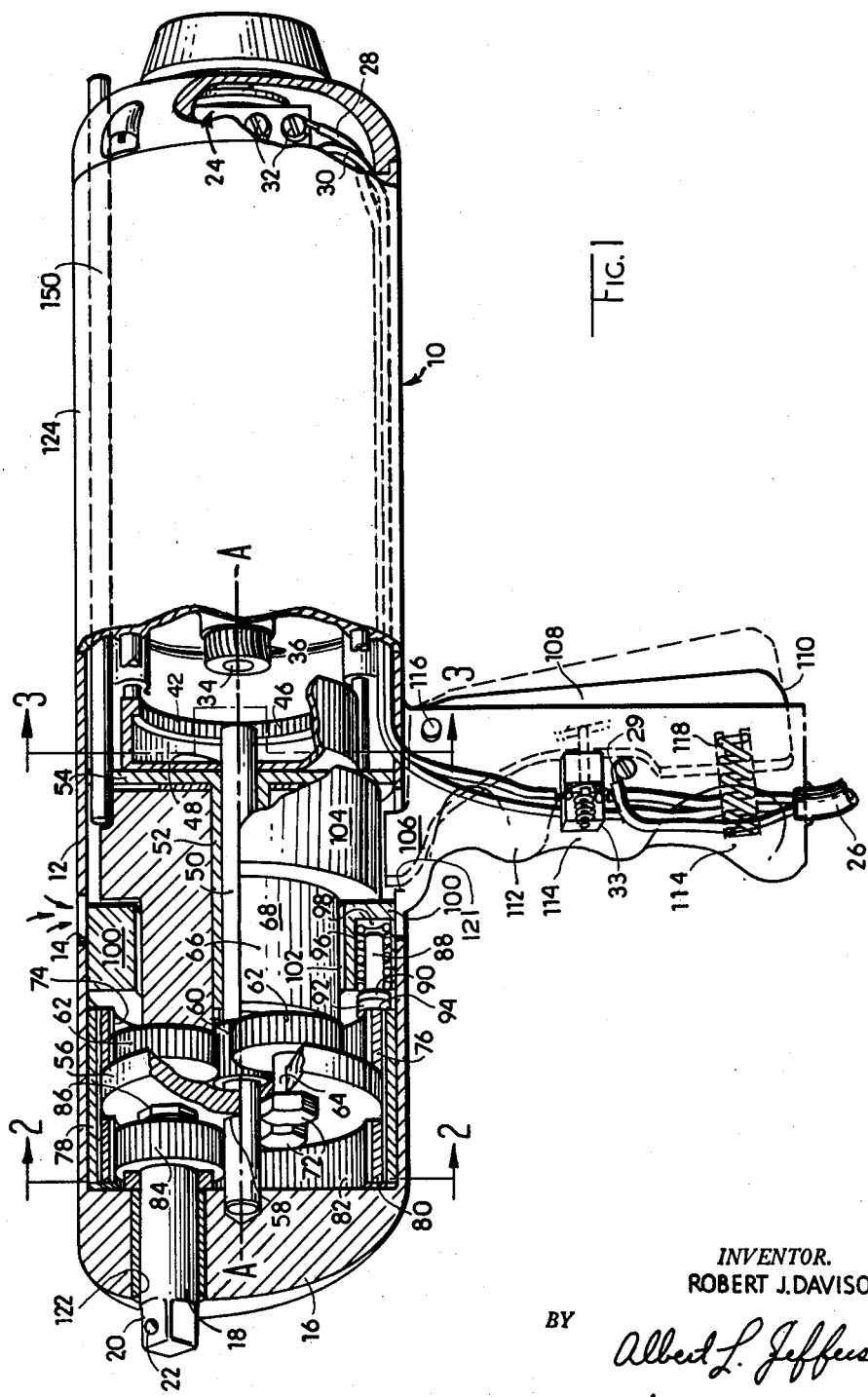
FIGURE 1 is an isometric view of a tool embodying features of the present invention and wherein the casing is broken away to illustrate the interior of the tool including the control mechanism for regulating its output speed.
Figure 2:
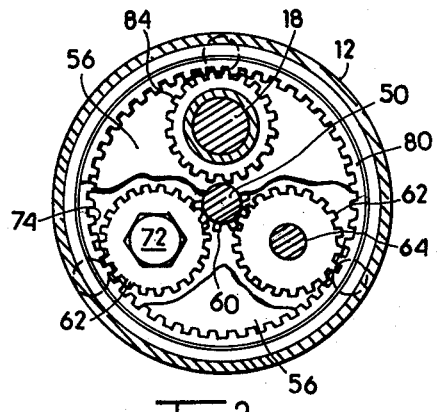
FIGURE 2 is a sectional view taken on line 2—2 of FIGURE 1.

Referring now to the drawings, the power tool is designated generally by reference numeral 10 and is housed within a casing 12 which may include suitable apertures, such as the ones indicated at reference numeral 14, to provide circulation of air through the interior of the casing 12 to effect cooling of the operating parts housed therein. The one end 16 of the tool has an output shaft 18 with a square cross section end 20 including a snap coupling 22 which adapts the shaft 18 for receiving a plurality of "snap-on" chucks having shanks (not shown) with the ends thereof adapted for turning, screwing, bolting, drilling and the like.

The particular power tool shown is electrically driven but the invention is by no means limited to a particular energy type motor, and the motor which is designated generally by reference numeral 24 can be gasoline powered as well as electrically driven and will still come within the teaching of the present invention. The electric motor 24 has a cable 26 with three lead wires 28, 29 and 30. The wire 29 is a conventional ground. The wires 28 and 30 are fastened to windings of the motor through terminals 32, and the opposite end of the cable 26 has a suitable plug (not shown) which can be inserted within an electric outlet or the like. The tool is best used with a momentary switch 33 of the contact type so that high orders of torque will not rotate the tool if the tool is torn out of the operator's grip. For breaking loose nuts and other tight fastenings, it is possible to put the tool in direct drive and "play" the switch to break the nut loose.

Figure 3:
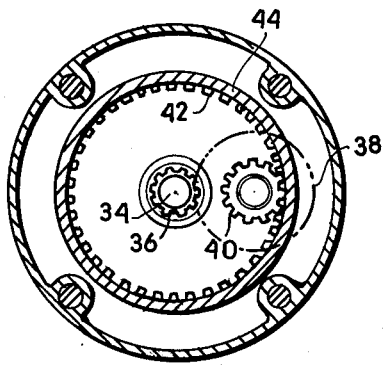
FIGURE 3 is a sectional view taken on line 3—3 of FIGURE 1.

The motor 24 powers a shaft 34 having a gear pinion 36 meshing with an idler gear 38 (FIGURE 3) which drives a reducing gear 40 which in turn meshes with teeth 42 of the ring gear 44, the ring gear being an integral part of cup-shaped member 46 which is connected at 48 to a shaft 50 (FIGURES 1, 3). The shaft 50 is journalled within a bushing 52 supported by a disk 54 at one end and a second disk 56 at the opposite end through opening 58. The disk 56 is a floating member and moves rotationally but is held axially, i.e., is held against movement to the right or to the left of its position shown in FIGURE 1.

The shaft 50 has a sun gear 60 which is driven thereby and a plurality of planetary gears 62 which mesh with the sun gear and are journalled on shafts 64 held at opposite ends by means of the disk 56 and reduced diameter end 66 of a cylinder 68. The shafts 64 can include bolt heads 72 to facilitate screwing the shaft 64 into cylinder 68 so that when the planetary gears 62 are mounted in place they will mesh with the interior teeth 74 of a ring gear 76 having a sleeve 78 and a second ring gear with teeth 82 meshing with pinion gear 84 secured by nut 86 to a power take-off shaft 18. The ring gears 76, 80 may be integrally related through sleeve 78.

The ring gear 76 is normally held stationary by means of a plurality of stems 88, each having a head 90 with a facing 92 in slidable engagement with an opposing edge 94 of ring gear 76 to retard rotational movement of gear 76, each stem being biased toward its opposed edge by a spring 96 which is mounted within a recess 98 of an annular housing 100 carried within casing 12. There is clearance between the housing 100 and the stepped diameter cylinder 68 as shown by reference numeral 102 so that there can be provided relative rotational speed therebetween. There is thus produced, normally, the condition that ring gears 76 and 80 are stationary and the planetary gears 62 simply revolve about the annular gear track 74 of ring gear 76 without producing rotation of the ring gear 76 which is held by friction facing 92.

The rate of revolvable movement of the planetary gears 62 about axis A—A is regulatable as will next be described, and such regulation is the means for controlling the output speed of the tool.

The stepped diameter cylinder includes a cylindrical braking surface 104 which is engaged by surface 106 of a trigger 108 having a grip portion 110 which extends beyond handle 112 to be engaged by the palm of the operator's hand when the operator's fingers encircle the recessed portions 114 of the handle. When the trigger is depressed, the momentary contact switch 33 is closed to energize motor 24. The trigger 108 is mounted on a pivot pin 116 and is biased by a spring 118 in a direction moving surface 106 of the trigger in a disengaging direction, away from drum surface 104. The casing 12 is apertured at 121 to allow surface 106 to move upwardly into engagement with surface 104 and thereby effect retarding effort on cylinder 68 whereby the planetary gears 62 will more slowly revolve about axis A—A and such slowing movement will cause the planetary gears 62 to drive ring gear 76 through its teeth 74 and thereby turn sleeve 78 and ring gear 80 therewith. The pinion gear 84 then causes power take-off shaft mounted in opening 122 to rotate and produce a similar rotation of whatever tool is coupled to the end 20 therewith and held by snap buttons 22.

The rate of turning of the tool is thus subject to the frictional effort exerted on drum surface 104 by the end 106 of trigger 108 with the general relationship being that no retarding effort will produce zero rotation of the tool, and the greater the degree of frictional impedance to rotation of cylinder 68, the more closely the tool will rotate at its upper limit of speed. It is thus possible for the operator by simply varying the gripping effort exerted by his palm on trigger 108 to effect whatever degree of frictional effort necessary to achieve the desired rate of turning of the tool. The operator has a certain "feel" or opposition developed by spring 118 and translates his effort into a degree of turning of the tool. The operator by squeezing or relaxing his grip determines the desired rate of actuation of the tool.

The operation of the tool is by no means limited to a single direction of rotation. The motor 24 can be reversed and the trigger 108 will engage the counter-rotating drum and whatever asynchronous speed is developed will counter-rotate the tool or shank 20 in accordance with the degree of gripping effort exerted on trigger 108.

Immediately upon releasing trigger 108, spring 118 disengages 106 from drum surface 104 and the planetary gears 62 resume their maximum angular speed about axis A—A which is no longer effective to rotate ring gear 76 which is immediately brought to a stop by engagement of its edge 94 with friction facing 92 and the tool is brought to a stationary condition.

Figure 5:
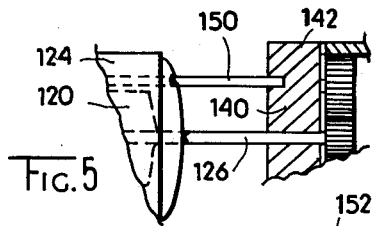
Figure 4:
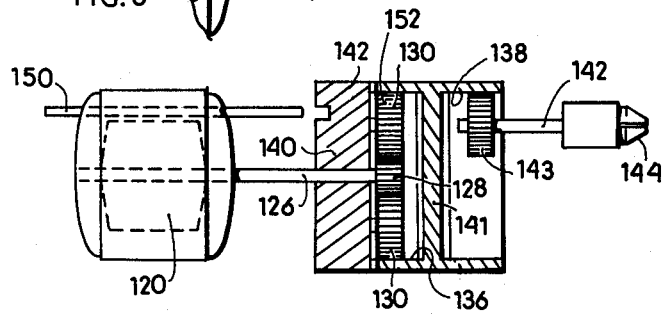
FIGURE 4 is a schematic view showing how the control mechanism can be combined with a power transmission in which the speed control is "locked in" to be operational in FIGURE 4, and the speed control is "locked out" in FIGURE 5 so that there is direct power transmission between the motor and tool in FIGURE 5.

Referring next to FIGURES 4 and 5, an optional arrangement can be provided within the power tool whereby the speed regulating feature is "locked out" and the motor includes a direct non-regulated power connection with the chuck which carries the working tool. In this embodiment, referring to FIGURE 4, the motor 120 is connected by power shaft 126 to a sun gear 128 meshing with planetary gears 130 which in turn mesh with a ring gear 136 which includes a second ring gear track 138 meshing with pinion gear 143 connecting through power take-off or working shaft 142 with a chuck 144 which holds the tool (not shown). The planetary gears 130 are carried on a disk support 140, disk 140 being connected with a cylindrical brake surface 142 which is engageable by a manual braking control (not shown). When the brake surface 142 slows the revolvable movement of planetary gears 130, the ring gear 136 drives ring gear 138 to rotate pinion gear 143 and turn the chuck 144 at a prescribed speed. This operation will produce controlled rotation of chuck 144 in one direction or the other through an infinite graduation of speeds from zero speed to maximum speed.

Assuming next it is desired to "lock out" the speed control feature, a manual control rod 150 (FIGURES 4, 5) is plunged forward through housing 124 into one of a series of recessed holes in outer edge of disk support 140 (corresponding to cylinder 68, FIGURE 1) to hold it against revolving. In this locked out position, the planetary gears 130 are in a fixed position causing ring gear 136 to effect synchronous rotation of ring gear 138. The control rod thus achieves a coupling of the work chuck 144 with the motor 124 in a manner bypassing the speed regulating means previously described. It is desirable to "lock out" the speed regulating means under some conditions of operation when it is desired to run the mechanism at maximum speed over a considerable period. The operator can, of course, by suitable manual or electrical operation (not shown) deactuate shaft 150 and resume operation from the motor to the chuck 144 using the features of speed control whenever desired.

Although the present invention has been illustrated and described in connection with certain selected embodiments of the invention, it will be understood that these are examples of the invention and are, therefore, illustrative and are not restrictive of my invention.

It is reasonably to be presumed that those skilled in the art can make numerous modifications and revisions which will suit individual design preference, and it is intended that such revisions and variations of the invention which incorporate the herein disclosed principles will be included within the scope of the following claims as equivalents of the invention.

What is claimed is:

1. A power tool control drive for regulating rotation of a work chuck and the like, comprising a handle, including a portion responsive to the grip of the individual holding the power tool through said handle, for controlling speed of tool operation, said handle having a movable portion, a control mechanism for governing the rotary speed of said chuck comprising a rotatable power shaft having a sun gear carried thereon, a plurality of planet gears which are both rotated and revolved by said sun gear, a ring gear provided in intermeshing relation with said planet gears and including power take off means for effecting rotation of a work chuck, means for mounting said planet gears and rotatable with the revolvable movement of said planet gears and adapted to be engaged by the movable portion of said handle to effect a retarding of the revolvable movement of said planet gear for controlling rotation of said planet gear mounting means to control revolvable movement of the planet gears, and effect a controlled rotation of said ring gear, and means for connecting said ring gear and chuck to provide a corresponding control of the tool operatively carried thereby.

2. A power tool having a manually operated control for regulating the speed of tool operation, comprising a handle for holding said power tool and including a movable grip portion which is responsive to gripping action of the operator to effect regulation of the tool operation speed, a motor-driven power shaft, a rotatable sun gear means connecting with said power shaft and rotated thereby, at least one planet gear meshing with said sun gear and having a mounting member for supporting said planet gear for both rotational and revolvable movement, a ring gear which is in mesh with said planet gear to be rotated thereby when said planet gear and sun gear are rotated asynchronously, means forming a part of said gripping portion and engageable with said mounting member for retarding turning of said mounting member to effect asynchronous rotation of said planet gear and sun gear to produce a rotary speed of said ring gear, and a work chuck operatively secured to said ring gear and adapted to drive a tool received therein.

3. A motor-driven tool having a chuck adapted for mounting said tool and rotatable at a controlled rate, comprising a handle which includes a movable portion responsive to the grip of the operator, in order to control the speed of tool operation a first gear having a power-driven connection effecting rotation thereof at a substantially constant rate, at least one combination rotatable and revolvable gear which meshes with said first gear, a third gear meshing with said second gear and which is non-rotatable when said first and second gears are rotating, means forming a rotatable drive connection forming a coupling between said chuck and said third gear whereby said chuck is caused to counterrotate by said third gear, and means forming a part of said movable grip portion adapted to effect the aforesaid relative rotation speed between said first and second gears for controlling the relative rotational speed between said first and second gears to control the rate of turning of said third gear and thereby controlling the rate of turning of said chuck and a tool mounted therein.

4. The structure in accordance with claim 3 wherein said means for effecting differential rotation between said first and second gears is effected by a mounting member for supporting said second gears for rotational movement, and means for journalling said mounting means to provide rotation thereof which causes a revolvable movement of said second gears, and friction means forming a part of a handle structure and adapted for impeding rotation of said mounting means to control the revolvable movement of said second gears and thereby control the differential rotation between said first and second gears which effects rotation of said third gear and the operatively interconnected chuck.

5. The structure in accordance with claim 3 including friction means for slidably resisting free rotation of said third gear to maintain said chuck in a normally non-rotating condition.

6. A portable power tool, comprising a casing having a carrying handle, a stepped diameter mounting member having a centrally disposed through passage, a power shaft extending through said passage and having a sun gear operatively driven thereby, a plurality of planet gears carried by said stepped diameter mounting member and meshing with said sun gear to be rotated thereby, a ring gear meshing with said planet gears and normally held against rotation when the sun gear and planet gears are rotated synchronously, means forming a brake disposed in the carrying handle which is adapted to impede said stepped diameter member from turning and thereby effecting asynchronous rotation of said sun gear and planet gears, said brake means responsive to variable grip pressure to control the output speed of the power shaft and a power take off shaft operatively rotatable by said ring gear and having a chuck for receiving a tool therein which is rotated at a speed from zero speed to an upper limit which is proportional to the braking effort exerted on said stepped diameter member.

References Cited in the file of this patent
UNITED STATES PATENTS

| | | |
|---|---|---|
| 1,130,309 | Mace | Mar. 2, 1915 |
| 1,154,769 | Hertzberg | Sept. 28, 1915 |
| 1,566,487 | Letin | Dec. 22, 1925 |
| 1,942,825 | Meunier | Jan. 9, 1934 |
| 2,246,673 | Glasner et al. | June 24, 1941 |
| 2,436,936 | Page | Mar. 2, 1948 |
| 2,515,565 | Mohl | July 18, 1950 |